Oct. 1, 1957 J. MARTIN 2,808,217
EJECTION SEATS FOR AIRCRAFT
Filed Sept. 1, 1954
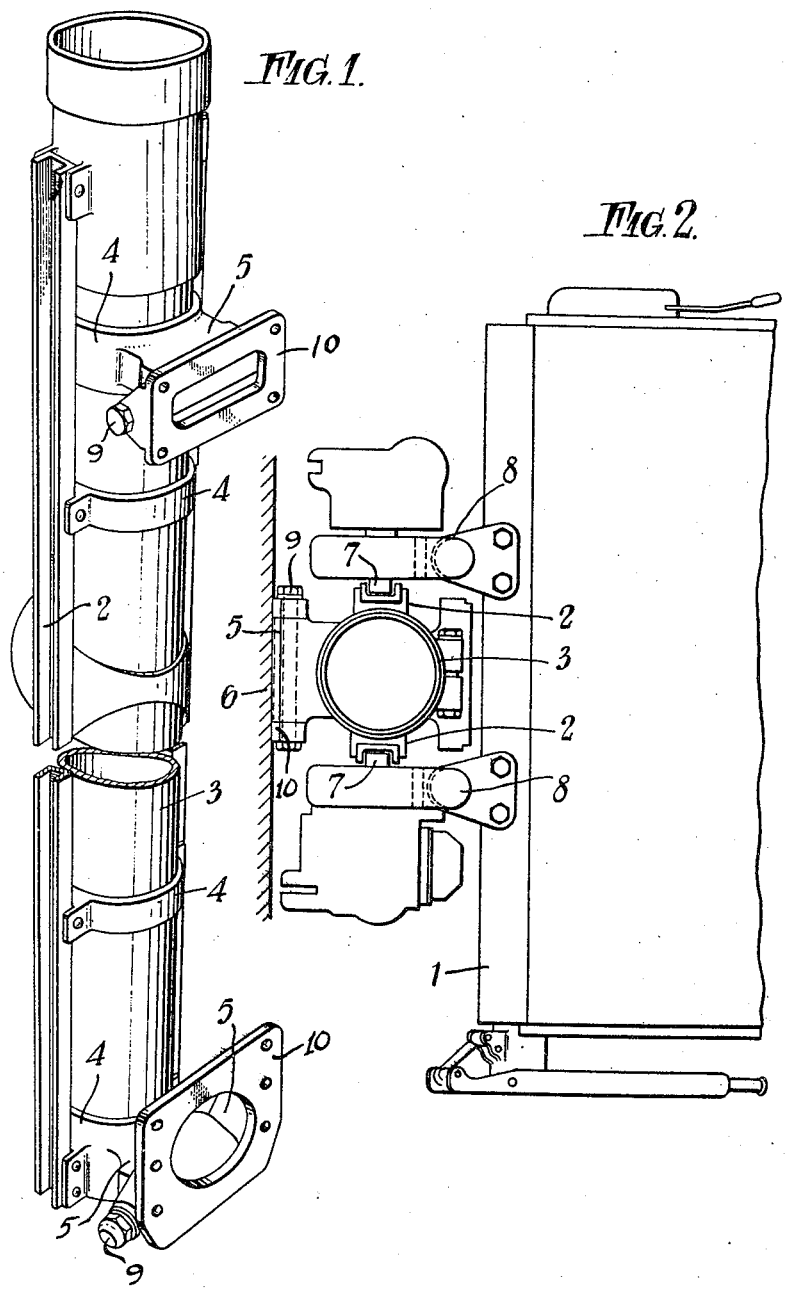
INVENTOR
JAMES MARTIN
per Worth Wade
Attorney

United States Patent Office 2,808,217
Patented Oct. 1, 1957

2,808,217

EJECTION SEATS FOR AIRCRAFT

James Martin, Denham, near Uxbridge, England

Application September 1, 1954, Serial No. 453,514

Claims priority, application Great Britain
September 4, 1953

1 Claim. (Cl. 244—122)

The invention relates to improvements in and relating to ejection seats for aircraft.

The invention is applied to ejection seats of the type which is adapted to be launched from an aeroplane or other aircraft with the occupant seated therein and mechanism is provided by which the seat is launched from the aircraft by means of an ejection unit actuated by an applied force, for example, by pressure generated by one or more explosive cartridges.

One form of ejection seat to which the invention is particularly adapted comprises a frame on which the seat is mounted, an ejection gun operating to eject the seat and its frame along guide means when the seat is ejected, a drogue or drogues, harness, harness release mechanism, and means operable as the seat is ejected from the aircraft to carry out automatically and in correct sequence and timing the operations necessary to allow the pilot to descend on a main parachute. There is provided a blind or screen which is adapted to be drawn into position over the face of the pilot before, and to remain in position during, the launching of the seat and its occupant from the aircraft. Means are provided interconnecting the blind or screen with the firing mechanism or gun so that the act of drawing the blind or screen into position will actuate or release the firing mechanism of the ejection gun.

The invention is well suited for incorporation in ejection seats forming the subject of my prior Patents Nos. 2,467,763; 2,527,020; 2,569,638; 2,638,294, and pending application Ser. No. 305,951.

The characteristic feature of the invention is a combined ejection gun and guides for the seat frame.

By the invention there is obtained simplicity in construction and a considerable saving in weight all tending to assist in the construction of a light weight ejection seat.

The fixed barrel or outer tube of an ejection gun is provided with guides for the seat frame, these guides being diametrically opposed and running longitudinally and parallel to the axis of the tube.

The guides may be attached to the barrel by means of suitable fittings located at spaced intervals therealong. These fittings may be provided with lugs or the equivalent serving as attachment points for the combined gun and guides to an aircraft structure.

Suitable runners or rollers attached to the seat frame would run along these fixed guides when the seat is ejected from the aircraft.

The accompanying drawings illustrate an example of carrying the invention into practice.

In the drawings:

Fig. 1 is a perspective view of the combined gun and guides, and

Fig. 2 a plan view showing the combined gun and guides and seat.

Referring to the drawings an ejection seat 1 is outlined in Fig. 2.

The guides for the seat frame in the example shown are in the form of channel rails 2 diametrically opposed and running longitudinally along the ejection gun barrel 3 and parallel to the axis thereof.

The channel rails 2 are attached to the barrel 3 by means of collar members 4. As shown the upper and lower collar members 4 have extensions or lugs 5 which are fixed by bolts 9 to a bracket 10 mounted on a part of the aircraft structure, for example, to the bulkhead 6. The upper member may be adjustable within limits.

Rollers or runners 7 attached to members 8 of the seat frame run along the channel rails 2 when the seat is ejected from the aircraft.

I claim:

In an apparatus for ejecting a seat from an aircraft, the combination of, an ejection seat, a gun having a cylindrical barrel, a plurality of separate spaced collars attached to and surrounding said barrel and arranged along the length of the barrel, a lug attached to the upper one of said collars, a lug attached to the lower one of said collars, said lugs providing means for attaching both ends of said gun to said aircraft, a pair of parallel channel rails attached to said gun by means of said collars on opposite sides of said barrel and aligned with the longitudinal axis of said barrel and spaced rollers mounted on said seat and positioned to ride in said rails, said gun furnishing the sole support for said rails.

References Cited in the file of this patent

UNITED STATES PATENTS

| | | |
|---|---|---|
| 2,467,763 | Martin | Apr. 19, 1949 |
| 2,516,902 | Musser | Aug. 1, 1950 |
| 2,538,427 | Rogers et al. | Jan. 16, 1951 |
| 2,552,181 | Kleinhans | May 8, 1951 |
| 2,579,683 | Lobelle | Dec. 25, 1951 |